Sept. 6, 1949.  F. B. HUTCHINSON ET AL  2,481,310
METHOD OF AND APPARATUS FOR INDICATING CROSS
SECTIONAL AREA OF A BORE OF A CAPILLARY TUBE
Filed Nov. 14, 1947  3 Sheets-Sheet 1
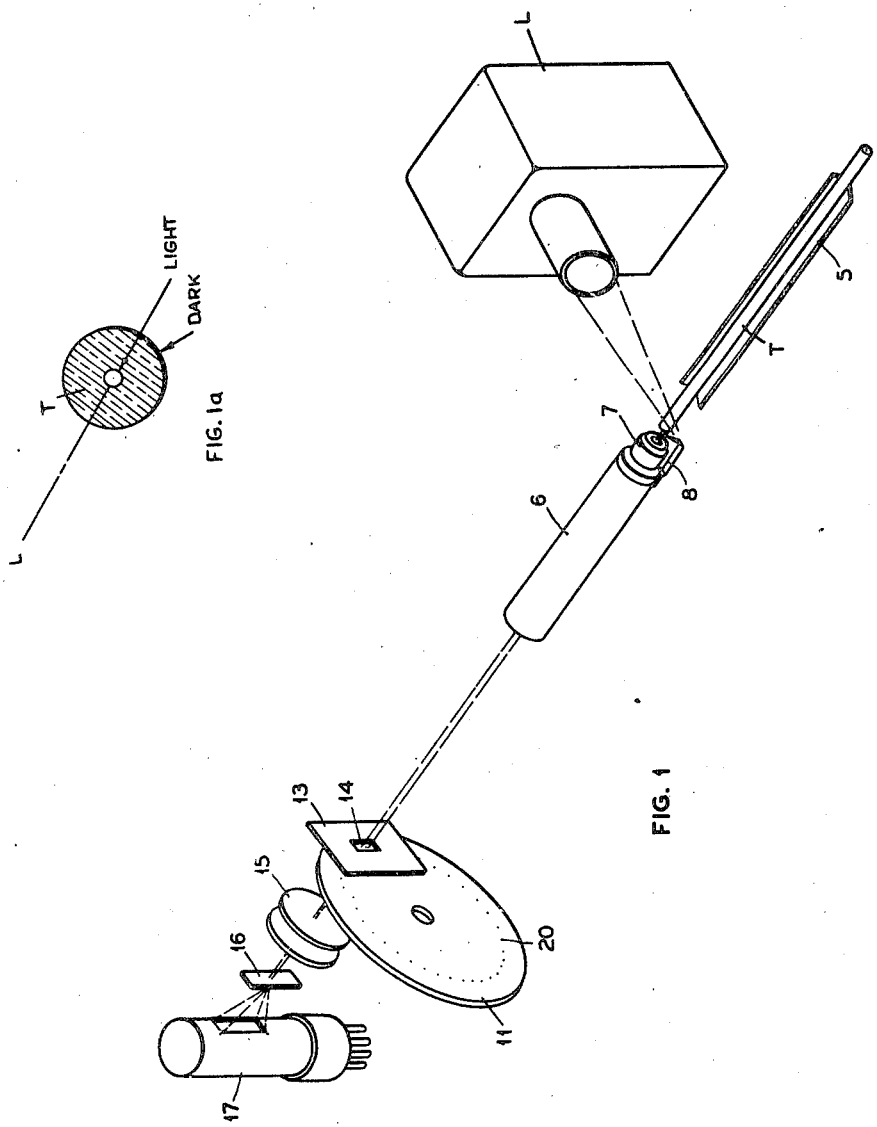
INVENTOR.
F. B. HUTCHINSON
C. W. MILLER
BY R. D. THOMPSON
D. Clyde Jones
ATTORNEY Sept. 6, 1949.　　F. B. HUTCHINSON ET AL　　2,481,310
METHOD OF AND APPARATUS FOR INDICATING CROSS
SECTIONAL AREA OF A BORE OF A CAPILLARY TUBE
Filed Nov. 14, 1947　　　　　　　　　　　　　　3 Sheets-Sheet 2
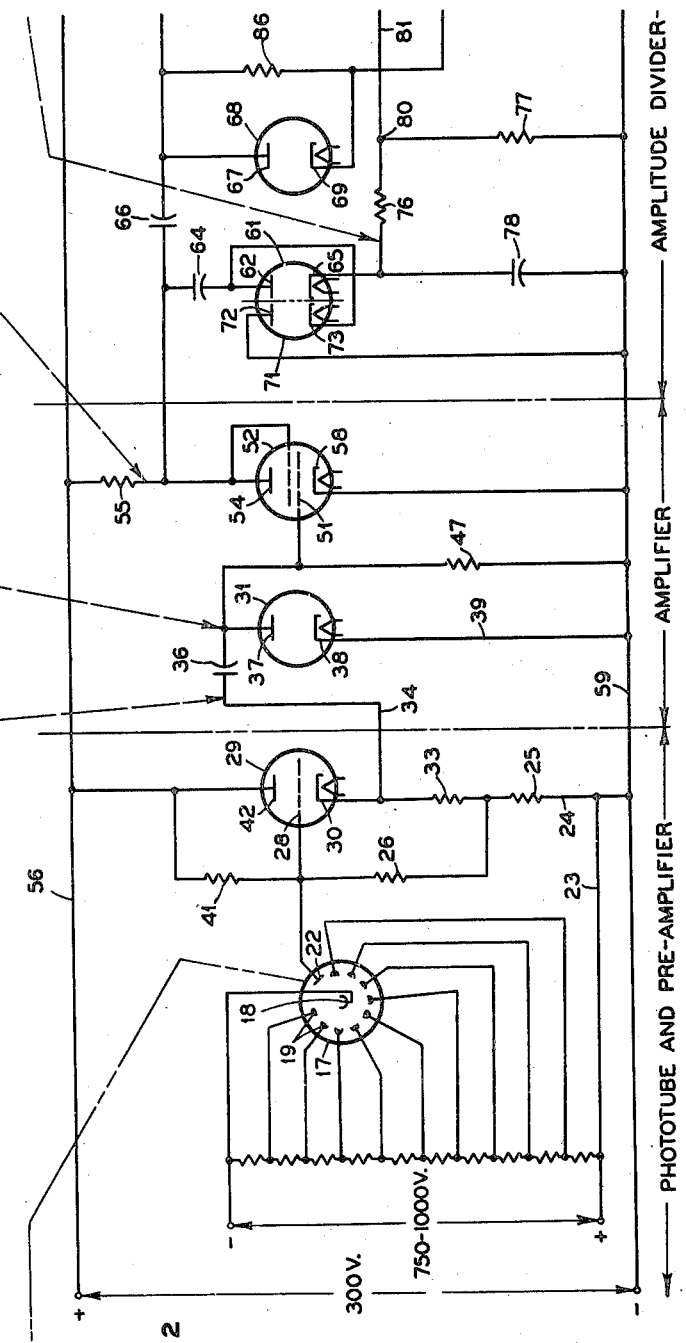
INVENTOR.
F. B. HUTCHINSON
C. W. MILLER
BY R. D. THOMPSON
D. Clyde Jones
ATTORNEY

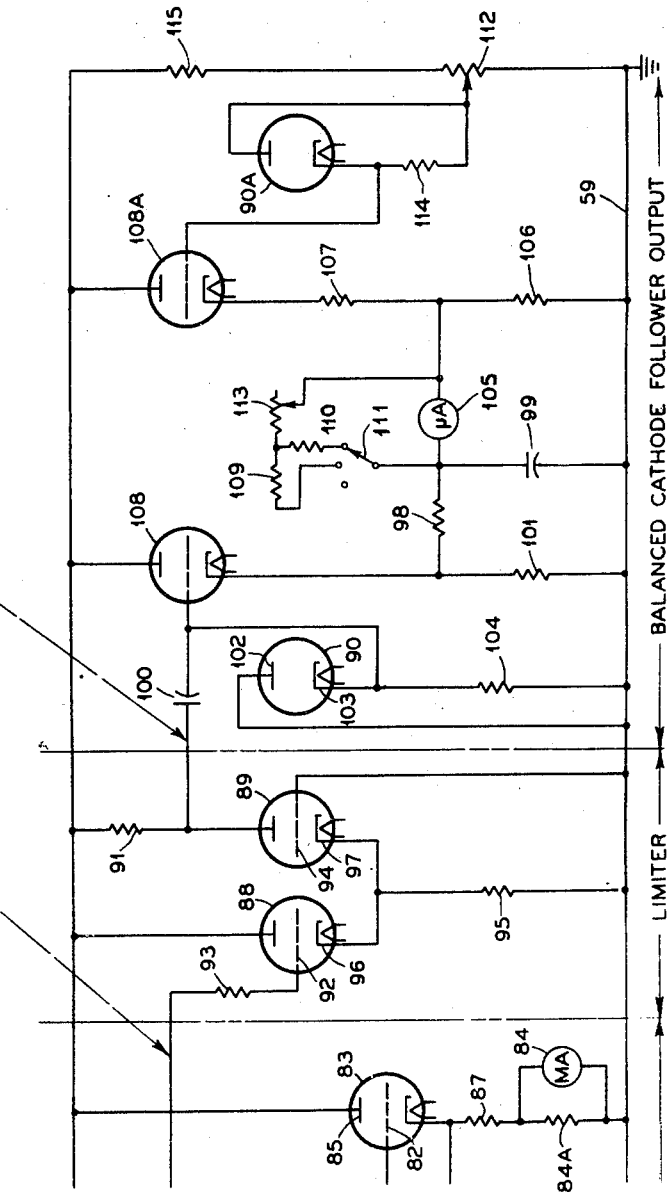
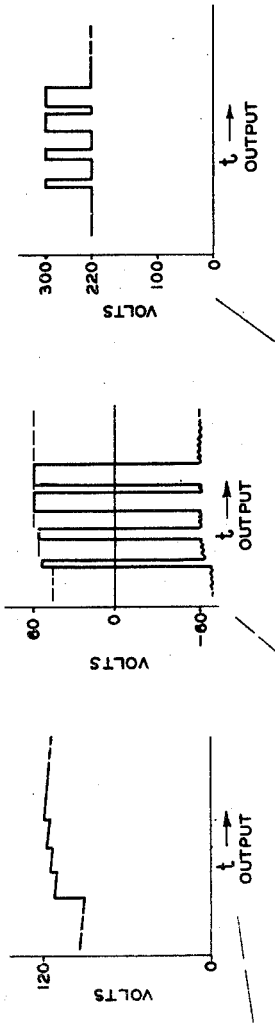
FIG. 3c
FIG. 3b
FIG. 3a
FIG. 3
INVENTOR.
F. B. HUTCHINSON
C. W. MILLER
R. D. THOMPSON
BY D. Clyde Jones
ATTORNEY Patented Sept. 6, 1949

2,481,310

UNITED STATES PATENT OFFICE 2,481,310

METHOD OF AND APPARATUS FOR INDICATING CROSS SECTIONAL AREA OF A BORE OF A CAPILLARY TUBE

Franklin B. Hutchinson and Carlton W. Miller, Rochester, and Robert D. Thompson, East Rochester, N. Y. assignors to Taylor Instrument Companies, Rochester, N. Y., a corporation of New York Application November 14, 1947, Serial No. 786,110

8 Claims. (Cl. 88—14)

This invention relates to a method of and to apparatus for indicating the cross sectional area of the bore of a capillary tube such as is used in the making of thermometric devices.

In the making of thermometric devices such as thermometers and thermometric tube systems, capillary tubes are employed. In certain types of thermometers, the capillary tube is made of glass while in certain other thermometric devices the tube systems thereof include capillary tubes made of metal. In each type, the bore of the capillary tube has such a very small cross sectional area that it becomes a difficult problem to measure that area with any degree of accuracy, and yet the manufacture of thermometers and such other devices, is greatly simplified if the cross sectional area of the bore is known with a high degree of accuracy.

In accordance with one conventional practice of measuring such bore areas, an operator using a microscope, visually compares with calibrated scales the major and minor axes of the cross-section of the bore, in the event that it deviates from a true circle and then from a given table computes from these major and minor axes measurements the area of the bore under investigation. The accuracy of such a computed area is entirely dependent on the accuracy with which the operator visually measures the two distances in question and if by chance the operator becomes fatigued, as frequently happens, the measurements may be quite inaccurate. The accuracy of this conventional method further depends on how closely the area to be measured approximates an ellipse, since the area read from the table is based on a perfect ellipse with the appropriate major and minor axes.

In accordance with the present invention the cross sectional area of the capillary bore is scanned whereby impulses of light corresponding to the unit areas of the entire area of the bore are translated into electrical impulses and electronic means is employed, which functions as a result of these impulses, to develop a visual indication on a calibrated meter, which indication is related to the cross sectional area of the bore.

The present invention has for its purpose the provision of a method of and apparatus for electronically measuring the cross sectional area of the bore of a capillary tube or the like.

The various features and advantages of the invention will appear from the detailed description and claims when taken with the drawings in which:

Fig. 1 is a view of a simplified showing of the optical portion of the measuring system together with a photo-electric tube;

Fig. 1a is a cross-sectional view, greatly enlarged, of a glass capillary tube showing the bright illumination of the bore area and the relative dark area of the surrounding glass where the light source is at one side of the tube.

Figs. 2 and 3 when taken together in the order named constitute a diagrammatic showing of the apparatus of the present invention; and Fig. 2a is a graph of the light impulses developed by scanning, while Fig. 2b, Fig. 2c, Fig. 2d, Fig. 3a, Fig. 3b and Fig. 3c represent oscillographs of the signal at the points indicated by broken-line arrows in the electrical system.

In the drawings, the numeral 5 designates a support in which a glass thermometer tube T or cane is securely held with its bore in alignment with the optical axis of a lens holder 6 including an objective lens 7. The holder is preferably provided with a sharp pointed projection 8 adapted to engage the end of the tube or cane T adjacent to the bore therein. By this arrangement, the end of the glass capillary tube or cane need not be a plane surface which is perpendicular to the long axis of the tube. In fact, the end of the tube may be somewhat irregular, that is, deviating from a true plane surface and yet, since the point of the projection 8 contacts the end of the cane adjacent to the bore therein, any resulting error, due to the mentioned irregularity, will be inconsequential. It is assumed that the cane or tube is glass and it is therefore illuminated from one side thereof by a light unit L including an incandescent lamp (not shown) of the type that employs a ribbon filament. If the capillary tube is made of metal or similar opaque material, the bore will be illuminated by light transmitted therethrough from the end of the tube that is farthest from the lens holder.

As a result of the side illumination of the glass cane or tube T, the light passing through the glass will be internally reflected from the surface of the bore so that the open end of the bore appears as an illuminated area with the surrounding glass of the tube appearing as a dark background. The lighted area of the open end of the bore is magnified by the objective lens 7 and the magnified image of the bore is focused on a perforated scanning disc 11 through an apertured plate 13 having a rectangular window or aperture 14 therein, the plate being positioned just ahead of the scanning disc which will be described further. A light collecting lens 15 having its major axis in alignment with the optical center of the aperture 14 and of the objective lens 7, focuses an image of the objective lens 7, upon a ground glass diffuser 16 which is interposed between the light collecting lens 12 and photo-electric tube 17. This arrangement, which is commonly known as "Kohler illumination" in microscopy, provides a stationary spot of light on the diffuser 16, the intensity of which light varies from full brilliance when an opening in the scanning disc is in alignment with the image of the bore, to complete darkness when the opening in the scanning disc is in registry with the dark portion of the image. It will be described how the scanning disc presents to the photo-electric surface of the cathode 18 in photo-electric tube 17, impulses of light corresponding to different minute areas of the bore image.

While either mechanical or electrical scanning may be used, mechanical scanning is herein disclosed. The mechanical scanner comprises a disc arranged to rotate on an axis parallel to the optical axis, the disc having a series of spirally arranged holes 20 therein. The radial distances of these holes with respect to the center of the disc, progressively, increase in length from the inner end of the spiral to the outer end thereof. The arrangement of these holes in the spiral pattern is such that as the scanning disc makes one complete revolution, the successive holes therein will scan the successive unit areas of the illuminated image corresponding to the area of the bore. The area of each scanning hole 20 is preferably as small as it is practical to make it and as herein illustrated, each of the holes is round. The circumferential distance between successive holes in the scanning disc is such that no two holes can simultaneously be in registry with the window 14 in the aperture plate. The difference in length between the radii of adjacent scanning holes with respect to the center of the disc is equal to the scanning hole diameter, therefore the lighted area of the image of the bore is effectively broken up into units or light impulses without overlap and corresponding to the illuminated area to be measured.

The impulses of light thus developed are directed on the cathode 18 of a photo-electric tube 17, preferably a multiplier photo-tube now sold under the code No. 931 A by the Radio Corporation of America. As a result of the light impulses impinging on the cathode of this tube 17, photo-electric current is developed. This current is multiplied many times by the tube as a result of secondary emission occurring at successive dynodes 19 diagrammatically illustrated as mounted within the tube 17. This tube is capable of multiplying feeble electric currents produced under weak illumination by several hundred thousand times and the resulting output current is a linear function of the exciting illumination, under normal operating conditions.

The electrons emitted from the illuminated cathode are directed to a first dynode 19, dislodge many other electrons from this dynode surface, the number of such dislodged electrons depending on the energy of the impinging electrons. These secondary electrons are then directed to a second dynode 19 from which still additional electrons are dislodged. This multiplying action is repeated at successive dynodes 19 with an ever increasing stream of electrons until those emitted from the last dynode 19 of the series are collected by the anode 22 and constitute the output current flowing in the output circuit of the photo tube. This output circuit extends from the cathode 18 of the photo tube which is connected to the negative terminal of the power source, through the power source to conductors 23 and 24, resistor 25, resistor 26 and thence to the anode 22 of the photo-tube. It will be noted that this output current flows through the load resistor 26 and that the voltage drop across this resistor is utilized to excite the grid 28 of a triode 29 which is connected as a cathode follower. It functions mainly as an impedance matching device which couples the very high impedance of the photo-tube to a D. C. restorer including the diode 31 and also to the power amplifier stage including the triode 52. The output circuit of the cathode follower 29 in which the output signal impulse appears, extends from ground through the resistors 25 and 33, conductor 34, through the capacitor 36 to the anode 37 of the diode section 31 in the D. C. restorer thence to cathode 38 of this diode and conductor 39 to the ground. The resistor 33 in the circuit of the cathode 30 of the cathode follower 29 provides the grid bias for the grid 28 of this follower. The grid return resistor 26 which is connected between the mid-point of resistors 25 and 33 and the grid 28 serves as the photo-tube load resistance. The resistor 41 which is connected between the anode 42 of the follower and the grid 28 thereof acts as a so-called plate bleeder. Due to the presence of this bleeder resistor, the quiescent or normal grid voltage is maintained at a definite value near zero with respect to the cathode. Consequently the grid of the cathode follower 29 can become more negative in response to negative signal pulses without danger of cut-off.

It will be noted that the positive side of the high voltage power supply is connected to ground and that the cathode 18 of the photo-electric tube is negative with respect to ground. Therefore the anode circuit of the photo-tube produces negative electrical impulses in response to increased light impulses. With no signal on the grid 28 of the cathode follower tube, the output voltage between the cathode 30 of this tube and ground, is at some positive value dependent upon the constants of the circuit. As the light impulses applied to the photo-tube increase in intensity, the output circuit from the anode of this tube becomes more negative. Therefore the grid 28 of the cathode follower tube 29 becomes more negative and the cathode 30 of this tube which follows the voltage change on the grid 28, also becomes less positive with respect to ground. As a result of the operation of this portion of the circuit network, the voltage output decreases in response to a signal impulse, the amount of this decrease being dependent on the strength of the electrical signal applied to the grid 28 of the cathode follower. The shape of the electrical wave at the output of the cathode follower 29 is indicated in Fig. 2b, the initiating light impulses being illustrated graphically in Fig. 2a. The output circuit of the cathode follower is connected by a blocking capacitor 36 to the anode 37 of a diode section 31 which functions as a D. C. restorer. A load resistor 47 is connected between the anode 37 and the cathode 38 of the diode which cathode in turn is connected to the ground conductor. The value of this load resistor 47 is so chosen that the ratio of the time constants of resistor 47, capacitor 36 and the time constants of the resistance of the diode 31 when the diode 31 is conducting and capacitor 36, is large. The time constants of the diode and capacitor 36 must be short while the time constants for the resistor 47-capacitor 36 combination must be relatively long.

In the operation of this D. C. restorer, let it be assumed that the applied voltage is at the quiescent state, that is, no signal voltage appears at the output of the cathode follower 29. The voltage of this follower is at a maximum at some positive value. This voltage charges the capacitor 36 and causes the anode 37 of the diode to become positive. The diode 31 now conducts rapidly and causes its anode 37 to approach ground potential. The voltage across the load resistor 47 is zero while the voltage applied from the output of the cathode follower 29 exists across the capacitor 36. As a result of an incoming signal, the output of the cathode follower is in the form of a descreased voltage. The voltage across the capacitor 36 can not follow this change instantaneously. As a result, a negative voltage which is the difference between the capacitor voltage and that newly applied, is present at the anode 37 of the diode, which becomes negative. This prevents the diode from conducting. However, the load resistor 47 conducts current and a difference voltage is developed across it. The recurrence of the impulses is of such frequency that the charge across the capacitor 36 has little opportunity to leak away to the value of the newly applied voltage, in the time interval involved. The algebraic sum of the voltage across the load resistor 47 and the voltage across the capacitor 36 is always equal to the applied voltage. The output voltage from the D. C. restorer is still equal to the voltage difference existing at the input of this restorer and the capacitor 36 has effectively removed the direct current component from the signal wave. This action may be conveniently referred to as negative clamping and with the cathode of the restorer 31 connected to ground, the reference potential is zero volts, with the signals going negative. This is indicated by the graph in Fig. 2c.

The anode 37 and the resistor 47 are connected to the grid 51 of a power amplifier triode 52. This amplifier provides the final amplification of the pulse signals. The anode 54 of this triode is connected through a load resistor 55 to the conductor 56 leading to the positive terminal of the power source, while the cathode 58 of this tube is connected to the ground conductor 59. The constants of the circuit of the power amplifier are such that when no signal is applied to the grid 51 thereof, the output voltage from the anode circuit of this power amplifier is maintained at some positive value. As the grid 51 becomes more negative, depending upon the amplitude of the applied pulses, the power amplifier tube conducts less current and the output builds up to a maximum value. The result is a signal of larger magnitude as is indicated by the graph shown in Fig. 2d.

The output of the power amplifier is applied simultaneously through a coupling condenser 64 to a peak measuring voltmeter and through another coupling condenser 66 to the D.-C. restorer involving the diode 68. The peak measuring voltmeter consists of a diode 61 utilized as a rectifier and a diode 71 used for positive clamping to ground, that is, to provide a conductive path to ground. The cathode 73 of the diode 71 is connected to the anode 62 of the rectifying diode 61 and the anode 72 of this clamping diode is at ground potential. A filter circuit including the capacitor 78 and the resistor sections 76 and 77 is connected between the cathode 65 of the rectifying diode and ground, to determine the peak value of the rectified pulses. During the quiescent condition, a given voltage, for example 100 volts, is applied to the voltmeter with the result that a potential of said given voltage prevails across the capacitor 64. Under this condition, the anode 62 of the rectifier diode 61 is at zero voltage with respect to ground, since the diode 71 is not conducting. The potential at cathode 65 is also zero and therefore there is no charge across the capacitor 78. Now let it be assumed that the incoming signal reaches an amplitude of 220 volts. Moreover, the time constant of the capacitor 64 and its associated series resistances is such that it can not respond instantaneously to this change so that the potential across it effectively remains at 100 volts. The anode 62 of the diode rectifier tube 61, however, becomes 120 volts positive. This causes the diode 61 to conduct current. The filter capacitor 78 charges rapidly, the electron path being through the diode 61 and through the positive clamping diode 71 to ground. This charging continues until the diode rectifier cathode 65 is at 120 volts with respect to ground. When there is no further potential difference across the diode rectifier tube 61, this tube ceases to conduct and the capacitor 78 starts to discharge slowly through the load resistor sections 76 and 77 of relatively long time constant. The incoming pulse voltage again drops to the quiescent value. The voltage across the capacitor 64 is still at the given value and the anode 62 of the rectifier diode is at ground potential. However, due to the long time constant of the filtering capacitor 78-resistor sections 76 and 77, the voltage at the cathode 65 and therefore across the load resistor sections 76 and 77 is still essentially 120 volts, the peak value of the applied pulse. Before the capacitor 78 has had time to lose much of its charge, another peak impulse is received and the procedure is repeated. Thus, as each impulse is applied to the pulse amplitude network, the condenser 78 charges to the peak value of the individual impulse so that the capacitor 78 acts as an integrator which follows the envelope of the peak impulses. This is illustrated by the graph in Fig. 3a. The capacitor 64 blocks the direct current component of the output current of the power amplifier so that the output of the diode section 61 is the peak value of the difference in voltages applied to the circuit. The peak value of the measured pulses exists across the sections 76 and 77 of the load resistor of the filtering network. This load resistor is tapped at a point 80 such that slightly more than half the voltage drop to ground is available. This voltage is applied through the conductor 81 to the grid 82 of a triode 83 which is connected as a cathode follower. This triode may be of the high mu type now sold under the code number 6SF5. A milliameter 84 and its shunt resistor 84a are connected in series with the load resistor 87 in the cathode circuit of the cathode follower. This millameter provides a means of monitoring the signal at desired levels. The peak measuring voltmeter, the D.-C. restorer and this cathode follower are herein referred to as a amplitude divider.

It was previously mentioned that the output of the power amplifier was also coupled through the capacitor 66 to the anode 67 of the D.-C. restorer stage which includes the diode 68. This restorer functions for negatively clamping the difference voltage to the half amplitude value, as determined by the peak measuring voltmeter. The D.-C. restorer stage consists of the blocking condenser 66, the diode 68 and a diode load resistor 86. The blocking capacitor 66 is connected in the anode circuit of this diode in the usual manner so that its cathode 69 is at a potential above ground equal to the half amplitude value of the incoming pulses. The general functioning of this D.-C. restorer is the same as that previously given.

However, the cathode potential of the D.-C. restorer is 60 volts above ground for the typical pulse amplitude of 120 volts. Therefore the D.-C. restorer clamps its signals with respect to this positive potential. In other words, when the voltage developed across the load resistor 86 is zero, the output, with respect to ground, is at a potential of plus 60 volts, corresponding to maximum amplitude received from the power amplifier. When the voltage developed across the load resistor is minus 120, the output is at a potential of minus 60 volts with respect to ground, corresponding to the steady state voltage from the power amplifier.

It will be seen that the zero reference level with respect to ground falls exactly midway (half amplitude point) between the minimum and maximum amplitude of the pulses. This is illustrated in the graph of Fig. 3b. The pulse widths (duration) at the zero reference line represent the time between which the scanning holes are half dark and half over the image at both the beginning and end of those particular lines under consideration. Thus the pulse width at zero reference is proportional to the width of the capillary image. It was for this reason that this proper zero reference was established; to have used the pulse width at any other portion of the pulse would have permitted possible error in area determination, since at no other portion of the pulse is the width strictly proportional to image width. The output wave shape from the amplitude divider is shown at Fig. 3b.

The pulses from the amplitude divider are supplied to a limiter, which is more fully disclosed in Patent No. 2,276,565 issued to Murray G. Crosby. This limiter consists of two high-mu triodes 88 and 89 with a common cathode resistor 95. A plate load resistor 91 is inserted in the plate circuit of triode 89 and the output of the limiter is derived at the plate of this triode. The signal is applied to the grid 92 of triode 88. A resistor 93 is provided to prevent the grid of triode 88 from becoming positive, and thereby loading the amplitude divider. It will be noted that if the grid-cathode voltage becomes positive, grid current will flow through resistor 93 and will cause a voltage drop of such polarity that the net grid voltage is held essentially at zero. The grid 94 of triode 89 is at ground potential.

The two triodes of the limiter are so connected that one triode acts as a cathode follower driving the cathode of the second triode through the coupling effected by the common cathode resistor 95. A positive voltage applied to the grid 92 of triode 88 causes more current to flow in the cathode circuit of triode 88, and as a result, more current through the resistor 95. The increased current through the cathode resistor raises the potential of the cathodes 96 and 97 in the positive direction. An increased positive potential on the cathode of triode 89 is the same as an increased negative voltage on the grid 94. Thus a positive voltage applied to the grid 92 of triode 88 is reversed in phase to an equivalent negative voltage on the grid 94 of triode 89. This phase reversal is repeated between the grid and plate of triode 89, so that the output is in phase with the input to triode 88. The characteristics of the limiter are such that those portions of all of the signal pulses having an amplitude less than minus four volts and greater than plus four volts are rejected. The resulting wave-shape is illustrated in Fig. 3c.

The pulse signals thus clipped or limited by the limiter are applied to a balanced or symmetrical cathode follower output circuit unit. This unit comprises a D.-C. restorer including the diode section 90 which effects positive clamping of the clipped pulse signals to a zero reference potential. This circuit unit also comprises a cathode follower including the triode 108 for impedance matching purposes and an averaging network comprising a resistor 98 and a capacitor 99. It will be noted that the output is shown in the form of a symmetrical circuit, that is, the D.-C. restorer diode section 90 is balanced by diode section 90A and the cathode follower 108 is balanced by the cathode follower 108A. The object of this symmetrical arrangement is to balance out thermal drifts, Edison effect, and contact potentials between the diodes and between the cathode followers.

The limiter output is applied to the D.-C. restorer 90 through blocking condenser 100. In this circuit the cathode 103 of the diode 90 is connected to the signal source and the plate 102 is at ground potential through conductor 59. The customary load resistor is inserted across the tube. The size of the load resistor is so chosen that the ratio of time constants of capacitor 100, together with the diode section 90, and of capacitor 100 together with the load resistor 104 is high, the diode circuit possessing the lower time constant. The operation of this restorer is the same as that of the D.-C. restorer previously described except that this restorer performs positive clamping.

The voltage existing across the cathode load resistor 101 is averaged by the mentioned network consisting of resistor 98, capacitor 99, and the combined resistance of the indicating microammeter 105 and resistor 106. The time constant of the averaging network is such that the meter 105 indicates the average value of the pulses contained in the successive scannings of the bore image. This average value of current is proportional to the area of the cane bore under examination and the microammeter is calibrated in units of area to give the desired area indication. The actual operation of the meter and filter circuit is such that two or three seconds after the insertion of the capillary tube in the device, the meter indicates the correct measured area.

The resistors 109 and 110 together with switch 111 permit a change in scale of the milliammeter. Adjustable resistor 112 permits an adjustment for zero setting of the microammeter and adjustable resistor 113 is useful in calibrating the same.

What we claim is:

1. The method of measuring the total cross-sectional area of the bore of a capillary tube which comprises supporting the tube in a steady position, directing light at the interior surface of the bore at one end thereof thus illuminating the entire area of the bore at one end thereof more brightly than the surrounding area of the tube, producing an image of the illuminated area, scanning the image of the illuminated bore area to develop light pulses proportional in duration to said area, translating said light pulses into correspondingly shaped electrical pulses, integrating said electrical pulses over a scanning cycle, and indicating the result of said integration of these pulses.

2. The method of measuring the total cross-sectional area of the minute bore of a capillary tube independent of the configuration of said bore which comprises supporting the tube in a steady position, directing light at the interior surface of the bore at one end thereof thus illuminating the bore at one end thereof by light internally reflected from the surface of the bore, producing a magnified image of the illuminated bore area, scanning the magnified and illuminated image of the bore area to develop light pulses proportional in duration to said area, translating said light pulses into corresponding electrical pulses, integrating said electrical pulses over a scanning cycle, and indicating the result of said integration of these electrical pulses.

3. The method of measuring the total cross-sectional area of the bore of a capillary tube which comprises fixedly supporting said tube, directing light at the interior surface of the bore at one end thereof thus illuminating said bore at one end thereof, producing a magnified illuminated image of the mentioned area, repeatedly scanning said illuminated image of the bore area to develop light pulses proportional in duration to said area, translating said light pulses into corresponding electrical pulses, averaging said electrical pulses throughout repeated scanning of the said image, and indicating the total value of said averaged pulses.

4. The method of measuring the total cross-sectional area of the bore of a glass capillary tube which comprises supporting the tube in a steady position, directing light through the side of the tube near one end thereof thus illuminating the area of the bore by light reflected from the interior surface of the bore, producing an image of the illuminated area, scanning the illuminated image of the bore to develop light pulses proportional in duration to said area, translating said light pulses into corresponding electrical pulses, averaging said electrical pulses, and causing the averaged electrical pulses to indicate the value of the total duration of the light pulses per scanning cycle.

5. In a mechanism for measuring the total cross-sectional area of the bore of a capillary tube, means for supporting the tube in a steady position, means for directing light at the interior surface of the bore at one end thereof whereby to illuminate the entire area of the bore at one end thereof more brightly than the surrounding area of the tube, means for producing a magnified illuminated image of said bore area, means for scanning successive minute areas of said magnified image to develop corresponding light pulses, photoelectric means for generating electrical pulses corresponding to said light pulses, means for averaging said electrical pulses, and means including an electrical meter for indicating the total value of the averaged pulses.

6. In a mechanism for measuring the total cross-sectional area of the bore of a capillary tube, means for directing light at the interior surface of the bore at one end thereof whereby to illuminate the entire area of the bore at one end thereof more brightly than the surrounding area of the tube, means for producing a steady magnified image of said bore area, means for scanning successive minute areas of said magnified image to develop corresponding light pulses, photoelectric means for generating electrical pulses of approximately rectangular wave form corresponding to said light pulses, means for limiting the amplitude of said electrical impulses whereby said amplitude is independent of light intensity or electrical amplification, means for averaging said electrical pulses, and means including an electrical meter for indicating the total value of the averaged pulses.

7. In a mechanism for measuring the total cross-sectional area of the bore of a capillary tube, means for directing light at the interior surface of the bore at one end thereof whereby to illuminate the entire area of the bore at one end thereof more brightly than the surrounding area of the tube, means for producing a steady magnified image of said bore area, means for scanning successive minute areas of said magnified image to develop corresponding light pulses, means for generating electrical pulses of approximately rectangular wave form in response to and proportional in width to the duration of said light pulses, means for averaging said electrical pulses, and means including an electrical meter for indicating the total value of the averaged pulses.

8. In a mechanism for measuring the total cross-sectional area of the bore of a capillary tube regardless of the shape of said area, means for directing light at the interior surface of the bore at one end thereof whereby to illuminate the entire area of the bore at one end thereof more brightly than the surrounding area of the tube, means for producing a steady brightly illuminated magnified image of said bore area as compared to the surrounding area of the tube, means for scanning successive minute areas of said magnified image to develop corresponding light pulses, photoelectric means for generating electrical pulses of approximately rectangular wave form in response to and proportional in width to the duration of said light pulses, means for the proper shaping of said pulses to accurately relate said pulses to said bore area, means for averaging said electrical pulses, and means including an electrical meter for indicating the total value of the averaged pulses.

FRANKLIN B. HUTCHINSON.
CARLTON W. MILLER.
ROBERT D. THOMPSON.

REFERENCES CITED

The following references are of record in the file of this patent:

UNITED STATES PATENTS

| Number | Name | Date |
| --- | --- | --- |
| 2,078,768 | Meier | Apr. 27, 1937 |
| 2,184,157 | Jones | Dec. 19, 1939 |
| 2,360,883 | Metcalf | Oct. 24, 1944 |